United States Patent
Balasubramanian et al.

(10) Patent No.: US 12,033,114 B2
(45) Date of Patent: Jul. 9, 2024

(54) SYSTEM AND METHOD FOR PROVIDING WAREHOUSING SERVICE

(71) Applicant: eBay Inc., San Jose, CA (US)

(72) Inventors: Ashok Balasubramanian, San Jose, CA (US); Harish Kumar Krishnasamy, San Francisco, CA (US); Dineshbabu Bhoopalan, Fremont, CA (US); Sureshkumar Karuppuchamy, San Jose, CA (US); Syed Musthafa Sikkander, San Jose, CA (US); Ravneet Kaur, San Jose, CA (US); Charles Douglas Watkins, San Jose, CA (US); Balasubramanian Jayamani, San Jose, CA (US)

(73) Assignee: EBAY INC., San Jose, CA (US)

( * ) Notice: Subject to any disclaimer, the term of this patent is extended or adjusted under 35 U.S.C. 154(b) by 108 days.

(21) Appl. No.: 17/368,127

(22) Filed: Jul. 6, 2021

(65) Prior Publication Data
US 2023/0010509 A1    Jan. 12, 2023

(51) Int. Cl.
*G06Q 10/087* (2023.01)
*G06F 18/214* (2023.01)
(Continued)

(52) U.S. Cl.
CPC ......... *G06Q 10/087* (2013.01); *G06F 18/214* (2023.01); *G06N 20/00* (2019.01); *G06Q 30/0621* (2013.01); *G06Q 30/0639* (2013.01)

(58) Field of Classification Search
CPC .................................................. G06Q 10/087
See application file for complete search history.

(56) References Cited

U.S. PATENT DOCUMENTS 10,504,061 B1*  12/2019  Shi ..................... G06N 20/00
10,535,023 B1*   1/2020  Kodgers ......... G06Q 10/06311
(Continued)

FOREIGN PATENT DOCUMENTS

CN       110633820 A       12/2019

OTHER PUBLICATIONS

Logistify AI is a Ugandan on-demand startup for warehouses in Africa. ICT Monitor Worldwide [Amman] Jun. 2, 2020. (Year: 2020).*

*Primary Examiner* — Michael Misiaszek
(74) *Attorney, Agent, or Firm* — SCHWEGMAN LUNDEBRG & WOESSNER, P.A.

(57) ABSTRACT

Systems and methods for providing warehousing services that utilize a machine learning model are provided. The system trains a machine learning model with training data comprising item attributes and transaction locations extracted from past transactions for each item category to identify a plurality of transaction zones where each item category has a highest probability for selling. Subsequently, the system receives a warehouse request to warehouse inventory in a remote location. At least one transaction zone is determined based on item attributes of the inventory by applying the trained machine learning model. Based on the determined at least one transaction zone, the system determines one or more warehouse spaces that satisfy a spacing requirement for the inventory and causes presentation of the warehouse recommendation. The warehouse recommendation can indicate the one or more warehouse spaces.

18 Claims, 6 Drawing Sheets

(51) Int. Cl.
    *G06N 20/00*     (2019.01)
    *G06Q 30/0601*     (2023.01)

(56) References Cited

U.S. PATENT DOCUMENTS

| | | | |
|---|---|---|---|
| 2006/0069629 A1* | 3/2006 | Schweitzer | G06Q 10/087 705/28 |
| 2010/0262521 A1* | 10/2010 | Robinson | G06Q 30/06 705/29 |
| 2015/0120599 A1* | 4/2015 | Deshpande | G06Q 10/0835 705/336 |
| 2016/0078510 A1* | 3/2016 | Gadre | G06Q 30/0611 705/26.4 |
| 2021/0294930 A1* | 9/2021 | Cai | G06F 30/13 |

* cited by examiner

SYSTEM AND METHOD FOR PROVIDING WAREHOUSING SERVICE

TECHNICAL FIELD

The subject matter disclosed herein generally relates to warehousing. Specifically, the present disclosure addresses systems and methods that provide a warehousing service that utilizes a machine learning model to recommend warehousing locations.

BACKGROUND

Conventionally, large third-party vendors make their warehouse space available to other large entities to store their inventory. However, individuals and smaller entities typically do not have access to, and subsequently cannot utilize, such warehouse space. Additionally, individuals and smaller entities may not know how much space they need or where to warehouse portions of their inventory in order to be closer to their buyers.

DETAILED DESCRIPTION

Figure 1:
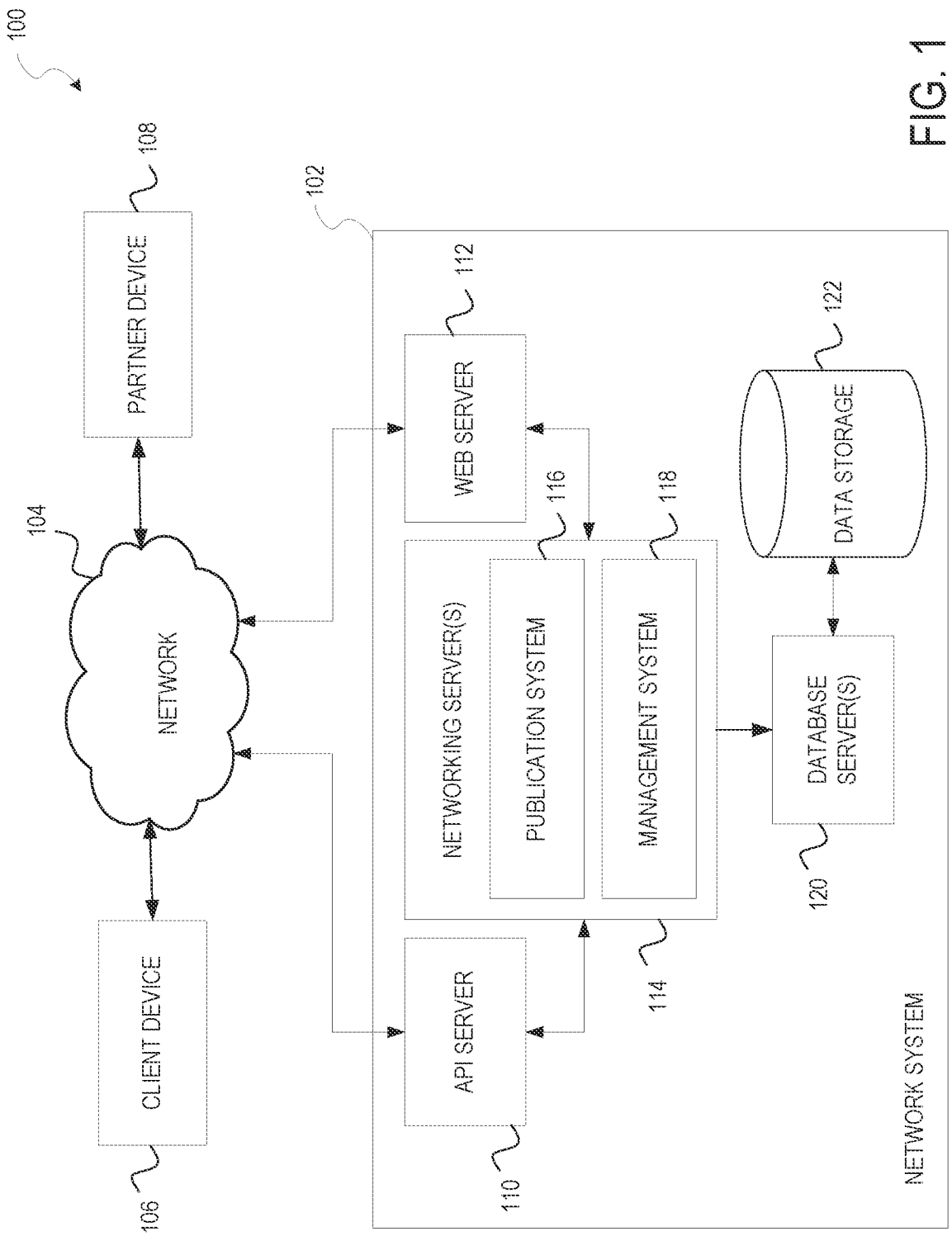
FIG. 1 is an example diagram illustrating a network environment suitable for providing a warehousing service that utilizes a machine learning model.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Systems and methods that machine-train (i.e., using machine-learning) a model and applies the model to an inventory of a user (e.g., an individual, a merchant, a business) to determine one or more transaction zones and warehouse spaces where to remotely store at least a portion of the inventory are discussed herein. The machine training involves training on data from past transaction histories. Accordingly, the transaction histories are accessed, and item categories identified. For individual item categories, the system extracts item attributes and item locations. The machine learning model is then trained with training data comprising the extracted item attributes and locations for individual item categories, An output of the training includes a probability of an item (or item category) having certain attributes selling in a given location or transaction zone. This can be computed to a score and stored in a persistent storage solution (e.g., SQL or non-SQL database).

During runtime, item attributes of an item or inventory to be warehoused are extracted and the machine learning model is applied to the item attributes. Application of the machine learning model results in identifying one or more transaction zones that are locations having the highest item sales probability for the item category associated with the item or inventory. Based on the one or more transaction zones, one or more warehouse spaces that satisfy a spacing requirement for the inventory is also determined. Subsequently, a warehouse recommendation is presented to a user, whereby the warehouse recommendation indicates one or more warehouse spaces that will satisfy a spacing requirement for warehousing the inventory in the one or more transaction zones.

Thus, example systems and methods maintain and utilize a machine-trained model that determines and recommends transaction zones and warehouse space in the recommended transactions zones. Example systems and methods also determine, based on the item attributes, an amount of warehouse space that should be recommended. In some cases, the system may also recommend an amount of inventory to be warehoused, monitor sales, and indicate if further inventory should be warehoused at a particular location based on the sales. The warehouse space may belong to individuals or small entities (e.g., small businesses) that have spare storage space (e.g., a garage, a storeroom). Owners of the warehouse space may comprise other sellers of the system.

Advantageously, example systems and methods provide individuals and smaller entities (e.g., small businesses) access to warehouse space. Additionally, example systems and methods can determine how much space individuals and smaller entities may need and/or where to warehouse portions of their inventory. Accordingly, the present disclosure provides technical solutions that accurately predict where inventory should be warehoused in order to be closer to buyers or end-users and recommend the transaction zones or locations along with appropriate spacing and, in some cases, quantity to be warehoused. The technical solution uses machine-learning to train a model that, at runtime, quickly identifies these transaction zones and recommends warehouse spaces.

FIG. 1 is a diagram illustrating an example network environment 100 suitable for providing a warehousing service that utilizes a machine learning model. A network system 102 provides server-side functionality via a communication network 104 (e.g., the Internet, wireless network, cellular network, or a Wide Area Network (WAN)) to one or more client devices 106 and partner devices 108. The network system 102 trains a machine learning model using transaction histories to determine probability of items selling in different locations (also referred to herein as "transaction zones") and, during runtime, applies the machine learning model to a warehouse request from a user that wants to warehouse their inventory in a remote location, as will be discussed in more detail below. The transaction zone can comprise a region based on a zip code, a city, a county, or other area in which transactions can be grouped together.

The transaction zone can be based on population size or a number of transactions (e.g., a location having a threshold number of transactions, such as 100 transactions, 1000 transactions, 10,000 transactions, and so forth). Accordingly, the transaction zone can be adjustable in size and location.

In example embodiments, the client device 106 is a device associated with a user (e.g., a seller) of the network system 102 that may want to warehouse at least some of their inventory at a remote location (e.g., a location that is different from where the user is based). However, the user may not know, for example, what location(s) would be best to warehouse their inventory in order to be closer to their customers and thus reduce shipping time. The user may also not know what item or items (or quantity of items) of their inventory should be warehoused remotely and/or how much warehouse space they will need at the remote location.

One or more partner devices 108 are also communicative coupled to the network 104. The partner device 108 is a device of a further user of the network system 102 that has warehouse space available (also referred to herein as a "fulfillment partner"). The fulfillment partner can onboard their available warehouse space to the network system 102. When warehouse space is rented from the fulfillment partner, the fulfillment partner may be responsible for fulfilling shipment of the items stored in their warehouse space. As such, the fulfillment partner may receive ratings related to their fulfillment service (e.g., from buyers and/or recipients) and their ratings may affect their future ability to provide warehouse space, as will be discussed in further detail below. The fulfillment partner at the partner device 108 may also be a seller on the network system 102 and may also warehouse their own inventory in a location of another user of the network system 102 that is remote from where the fulfillment partner is located.

The client device 106 and partner device 108 interface with the network system 102 via a connection with the network 104. Depending on the form of the client device 106 and partner device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 and paltrier device 108 may comprise, but are not limited to, a smartphone, tablet, laptop, multi-processor systems, microprocessor-based or programmable consumer electronics, game consoles, set-top boxes, a server, or any other communication device that can access the network system 102. The client device 106 and partner device 108 may comprise a display module (not shown) to display information (e.g., in the form of user interfaces). The client device 106 and/or the partner device 108 can be operated by a human user and/or a machine user.

Turning specifically to the network system 102, an application programing interface (API) server 110 and a web server 112 are coupled to, and provide programmatic and web interfaces respectively to, one or more networking servers 114. The networking server(s) 114 host a publication system 116 and a warehouse management system 118, which comprises a plurality of components, and which can be embodied as hardware, software, firmware, or any combination thereof. The management system 118 will be discussed in more detail in connection with FIG. 2.

The publication system 116 publishes content on a network (e.g., Internet). As such, the publication system 116 provides a number of publication functions and services to the users (e.g., buyers and sellers) that access the networked system 102. For example, the publication system 116 can host a marketplace application that provides a number of marketplace functions and services to users, such as publishing, listing, and price-setting mechanisms whereby a seller may list (or publish information concerning) goods or services (also collectively referred to as "items") for sale, a potential user or buyer can express interest in, indicate a desire to, and/or offer to purchase such goods or services, and a transaction pertaining to the goods or services is processed. However, it is noted that the publication system 116 may, alternatively or in addition, be associated with a non-marketplace environment such as an informational environment (e.g., search engine) and/or social networking environment.

The networking servers 114 are, in turn, coupled to one or more database servers 120 that facilitate access to one or more information storage repositories or data storage 122. The data storage 122 is a storage device storing transaction histories. Additionally or alternatively, the data storage 122 is a storage device that persists available warehouse space with size and location information.

Any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 and partner devices 108 may be embodied within the network environment 100. While only a single network system 102 is shown, alternatively, more than one network system 102 can be included (e.g., each localized to a particular region).

Figure 2:
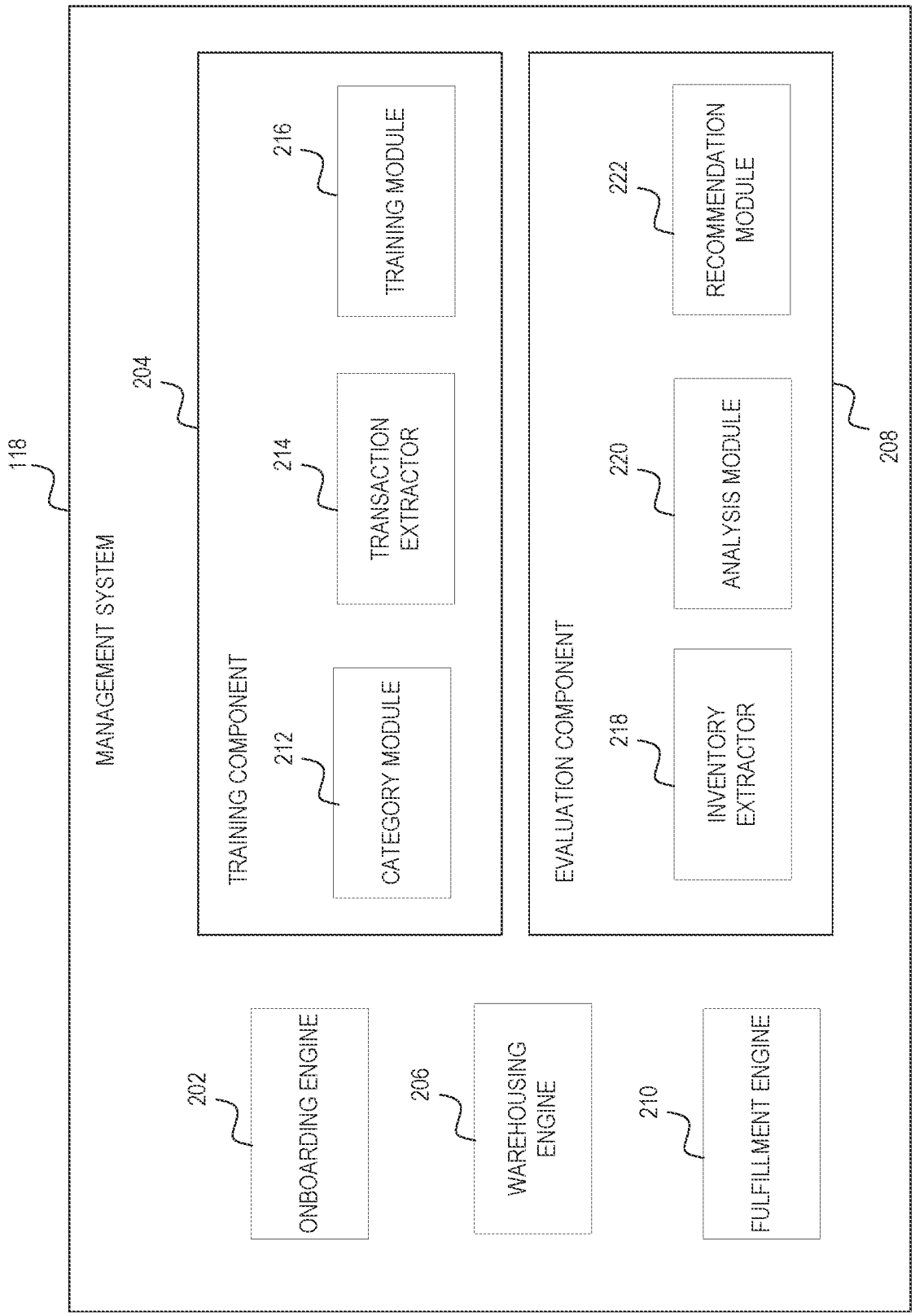
FIG. 2 is a block diagram illustrating components of a warehousing management system.

FIG. 2 is a block diagram illustrating components of the warehousing management system 118. The management system 118 is configured to train a machine learning model, which during runtime, identifies one or more transaction zones. The management system 118 also onboards warehouse space and monitors fulfillment by fulfillment partners. To enable these operations, the management system 118 includes an onboarding engine 202, a training component 204, a warehousing engine 206, an evaluation component 208, and a fulfillment engine 210 all configured to communicate with each other (e.g., via a bus, shared memory, or a switch), While FIG. 2 shows the training component 204 and the evaluation component 208 being embodied within the management system 118, alternatively, the training component 204 can be separate from the evaluation component 208 in different systems or servers.

The onboarding engine 202 is configured to onboard available warehouse space from potential fulfillment partners (e.g., users of the partner devices 108). The onboarding engine 202 causes presentation of an onboarding user interface to a potential fulfillment partner via one of the partner devices 108, The onboarding user interface may include input fields for describing a type of warehouse space that the potential fulfillment partner has (e.g., garage, warehouse, storage shed), a size of the warehouse space (e.g., dimensions in meters or feet), and/or a location of the warehouse space (e.g., city, zip code), and so forth.

The onboarding engine 202 also performs a risk and validation process for the potential fulfillment partner. The risk and validation process uses a trust integration process while onboarding to set limits for fulfillment partners. The trust integration process may evaluate, for example, ratings and/or reviews, including shipping feedback, of the potential fulfillment partner and length of time on the network system 102. The ratings may be associated with past fulfillment partnerships/warehouse services provided by the potential fulfillment partner or may be associated with the potential fulfillment partner's own sales activities on the network system 102. Other conditions or standards considered by the trust integration process can include quality of shipping or fulfillment services (e.g., shipping time, costs). The risk and validation process also includes execution of agreements/contracts during the onboarding or signup process that outline the responsibilities of the potential fulfillment partner. If the potential fulfillment partner satisfies the conditions/standards for being a fulfillment partner, the warehouse space of the potential fulfillment partner is persisted in storage (e.g., data storage 122) with size and location information.

The training component 204 trains a machine learning model using training data derived from past transactions that occurred via the network system 102 (e.g., facilitated by the publication system 116). The machine learning can occur using linear regression, logistic regression, a decision tree, an artificial neural network, k-nearest neighbors, and/or k-means, to name a few examples. The training component 204 can comprise a category module 212, a transaction extractor 214, and a training module 216.

The category module 212 manages item categories for training the machine learning model. The category module 212 accesses a data storage (e.g., data storage 122) that stores past transactions of items. The category module 212 then identifies and groups past transactions based on item categories. The category module 212 can then select one or more item categories with which to train the model. As such, the category module 212 operates as a filter to select the past transactions of particular item categories from which data will be used to train the model.

The transaction extractor 214 is configured to extract training data from the past transactions for a particular item category. For individual item categories, the transaction extractor 214 extracts item attributes and a transaction location for each past transaction for the individual item categories. For example, the transaction extractor 214 can scan the past transactions and identify item attributes from item attribute fields and a transaction location from a location field. The extracted data is then passed to the training module 216.

While the description above identifies item categories prior to extracting attributes, alternatively, the order can be reversed. For example, the transaction extractor 214 can extract item attributes and a transaction location for each past transaction and then the category module 212 clusters extracted item attributes and transaction locations based on item categories. In these cases, the item category may be one of the attributes that is extracted from the past transaction.

The training module 216 trains the machine learning model using, for example, neural networks or classical machine learning. The training data or input used for training includes the item attributes and a transaction location for each past transaction for items in the same item category. The inputs can also include shipping details (e.g., time to ship, cost to ship), fulfillment partner ratings, and risk assessments. The training of the machine learning model includes calculating probabilities of items or item categories selling in given locations or transaction zones.

The warehousing engine 206 manages the warehousing process at a remote location. A user that wants to warehouse their inventory transmits a warehouse request to the warehousing engine 206. The warehouse request can indicate an item or item category that the user wants to warehouse at a remote location. Alternatively or additionally, the warehouse request indicates that the user wants the management system 118 to recommend items within the user's inventory to warehouse in the remote location. The request triggers the evaluation component 208.

During runtime, the evaluation component 208 of the management system 118 is configured to identify one or more transaction zones to recommend based on attributes of an item, item category, or inventory to be warehoused. To perform these operations, the evaluation component comprises an inventory extractor 218, an analysis module 220, and a recommendation module 222.

The warehousing engine 206 receives the warehouse request from the user that wants to warehouse their inventory in a remote location. The inventory of the user is known to the network system 118 based on the user publishing inventory information (e.g., listings) with the publication system 116. Therefore, the inventory extractor 218 can access the inventory of the user directly from the publication system 116. The inventory extractor 218 then extracts item attributes of the item(s) or item categories of the inventory that the user wants to warehouse. If the user has not yet published or listed the items that they want to warehouse, the warehouse request indicates the specific item or item category the user is interested in warehousing and the inventory extractor 218 extracts the attributes from the warehouse request or from a database of items that contains a listing of similar items available on the network system 102.

The extracted item attributes are then passed to the analysis module 220, which applies the machine learning model to the extracted item attributes. The analysis module 220, using the machine learning model, matches the attributes used to train the machine learning model to the extracted attributes from the items or item categories to be warehoused to find the closest matching set of attributes. The analysis module 218 identifies item sale probabilities for a plurality of transaction zones for the closest matching set(s) and selects one or more transaction zones having the highest item sales probabilities for each item or item category to recommend. Thus, the analysis module 218 can identify a combination of an item (or item category) and corresponding transaction zones where the item is predicted to sell. If more than one type of item is in the inventory, the analysis module 218 may provide multiple recommendations for item/transaction zone combinations.

In some cases, the user can specify the item or item category that the user wants to warehouse at a remote location and the analysis module 220 performs its analysis with respect to that item or item type (e.g., using the attributes of that item or item type). Alternatively or additionally, the user can indicate a desire to warehouse part of their inventory at a remote location, and the inventory extractor 218 extracts the attributes for item categories in the inventory and the analysis module 220 analyzes the different item categories of the inventory to provide a recommendation of what items or item category to warehouse at which transaction zone.

The selected one or more transaction zones and, in some cases, the item or item category to be warehoused, is passed to the recommendation module 222, which provides the recommendation to the user of the client device 106. In some embodiments, the recommendation module 222 presents the recommendation of the transaction zone (and possibly the item category) on a user interface of the client device 106.

The recommendation module 222 may determine, based on the selected transaction zone(s) one or more warehouse spaces that satisfy a spacing requirement for the inventory. For example, the recommendation module 222 may determine, based item attributes related to sizing, an amount of space that is required for an item. The analysis module 220 or recommendation module 222 may determine a number of items to warehouse at a particular transaction zone based on historical item transactions. Alternatively or additionally, the user may specify a number of items to be warehoused. As such, the recommendation module 222 can determine based on the number of items and the amount of space required for each item, a total amount of warehouse space that is required. The recommendation module 222 then accesses the available warehouse space that has been persisted and identifies one or more warehouse spaces that satisfy the spacing requirement for the inventory to be warehoused. The recommendation module 222 then presents the warehouse recommendation that indicates the one or more warehouse spaces to the user. For example, the one or more warehouse spaces can be displayed on the user interface to the user.

The user can select a warehouse space via the user interface. The selection of the warehouse space can trigger display of an agreement or contract between the user and the fulfillment partner. Once the user agrees to the terms of the agreement, the user is provided instructions (e.g., a shipping label) to ship his items to the selected warehouse space by the warehousing engine 206. In cases where the items have not been published to the network system 102, the user can now list the items with the publication system 116.

While example systems discuss the evaluation component 208 determining one or more transaction zones to recommend to the user, alternatively, the user may already know a location or transaction zone in which to warehouse their inventory. These users may also have an idea of the amount of space that they require at the location. In these cases, the user may be presented with a user interface that allows the user to input a location (e.g., a zip code) and amount of desired space. The warehousing engine 206 can then search for available warehouse space that match the inputted location and spacing requirement.

The fulfillment engine 210 is configured to manage fulfillment associated with a warehoused item. When a warehoused item is sold, the fulfillment engine 208 generates and provides a shipping label to the fulfillment partner. The fulfillment engine 208 also monitors the fulfillment service performed by the fulfillment partner on behalf of the user. For example, the fulfillment engine 210 may track the shipping of the item and obtain ratings for the fulfillment/shipping process. The ratings may be associated with shipping speed or shipping issues (e.g., item poorly packaged). The ratings can be used to update the risk and validation process for the fulfillment partner. If the fulfillment partner receives poor reviews, the fulfillment partner may be prevented from onboarding future warehouse space or may not be recommended for future fulfillment partnerships. Conversely, if the fulfillment partner has high ratings, a publication for an item that will be fulfilled by the fulfillment partner may indicate that the item of the publication is fulfilled by a trusted partner or other similar notification.

The warehousing engine 206 also monitors (or is in communication with the fulfillment engine 210 regarding the monitoring) the fulfillment process and/or a transaction involving a warehoused item. That is, the warehousing engine 206 monitors or tracks the sales of inventory stored at a warehouse space. Based on the monitoring, the warehousing engine 206 can provide a notification to the user to move more inventory to the warehouse space when inventory reaches a low threshold at the warehouse space.

Figure 3:
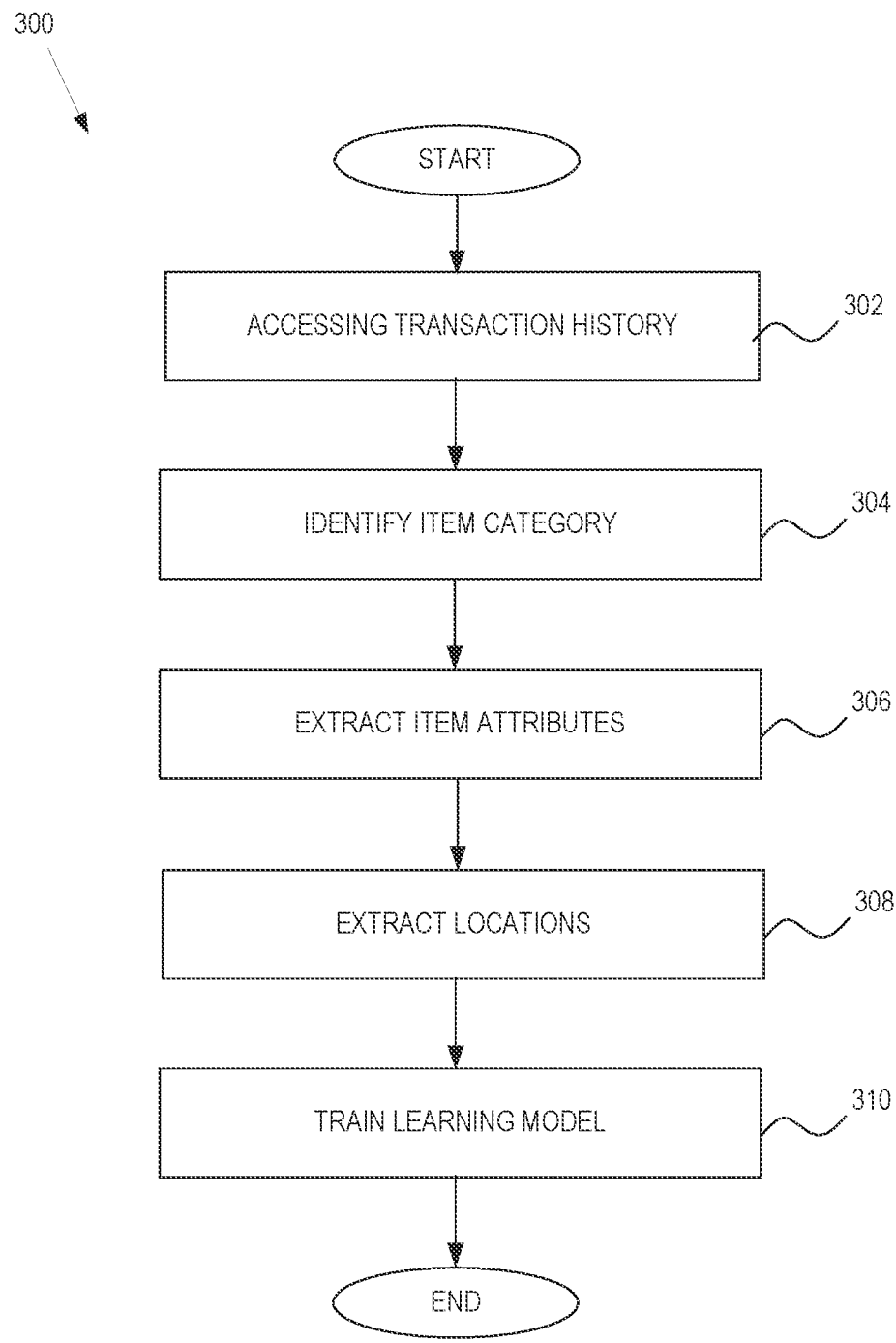
FIG. 3 is a flowchart illustrating operations of a method for training the machine learning model of the warehousing management system.

FIG. 3 is a flowchart illustrating operations of a method 300 for training a machine learning model of the warehouse management system 118, according to some example embodiments. Operations in the method 300 may be performed by the management system 118 (e.g., the training component 204) of the network system 102, using components described above with respect to FIG. 2. Accordingly, the method 300 is described by way of example with reference to the management system 118. However, it shall be appreciated that at least some of the operations of the method 300 may be deployed on various other hardware configurations or be performed by similar components residing elsewhere in the management system 118. Therefore, the method 300 is not intended to be limited to the management system 118.

In operation 302, the category module 212 accesses past transaction histories. The category module 212 can access a data storage (e.g., data storage 122) that stores past transactions of items on the network system 102. The past transaction histories may be for a predetermined amount of time (e.g., within the last 6 months or year).

In operation 304, the category module 212 identifies and groups past transactions based on item categories. The category module 212 can then select one or more item categories with which to train the model. The model may be trained for certain item categories or all item categories. In cases where the model only trains for certain item categories, the category module 212 will identify transactions for those item categories.

In operation 306, the extractor module 214 extracts data from the past transactions for individual item categories for which the model will be trained. For individual item categories, the transaction extractor 214 extracts one or more item attributes of an item that was transacted and a transaction location for each past transaction. For example, the transaction extractor 214 can scan the past transactions and identify item attributes from item attribute fields.

In operation 308, the extractor module 214 also extracts transaction locations form the past transactions. The transaction location may be the location of the buyer. For example, the transaction extractor 214 can scan the past transaction and identify a transaction location from a location field.

In operation 310, the training module 216 trains the machine learning model. The training can be performed using neural networks, classical machine learning, or other machine learning algorithms. The training data or input used for training includes the extracted item attributes and transaction location for each past transaction for items in the same item category. The training module 214 trains on the training data and outputs probabilities of items or item categories selling in various transaction zones. The machine learning model is then maintained (e.g., stored, periodically updated) for use during runtime.

Figure 4:
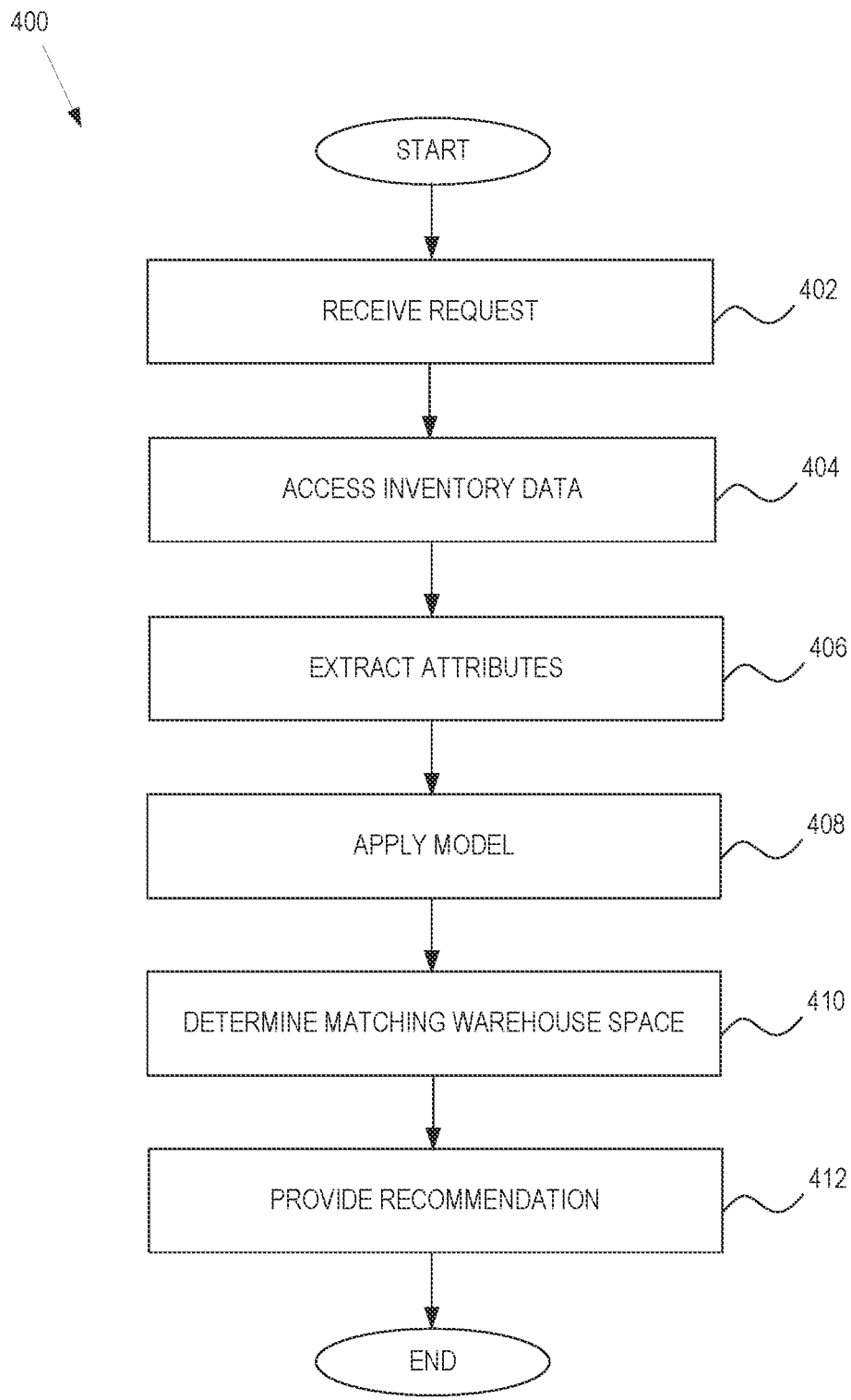
FIG. 4 is a flowchart illustrating operations of a method for providing warehousing service using the machine learning model.

FIG. 4 is a flowchart illustrating; operations of a method 400 for providing warehousing service using the machine learning model. Operations in the method 400 may be performed by warehouse management system 118 (e.g., the evaluation component 208) of the network system 102, using components described above with respect to FIG. 2. Accordingly, the method 400 is described by way of example with reference to the management system 118. However, it shall be appreciated that at least some of the operations of the method 400 may be deployed on various other hardware configurations or be performed by similar components residing elsewhere in the network environment 100. Therefore, the method 400 is not intended to be limited to the management system 118.

In operation 402, the warehousing engine 206 receives a warehouse request from the user that wants to warehouse their inventory in a remote location. The request may be received via a warehouse request user interface that is presented on the client device 106 by the warehousing engine 206. The warehouse request can indicate the item or item category that the user is interested in warehousing.

In operation 404, inventory data of the user is accessed. The inventory of the user may be known to the network system 118 based on the user publishing inventory information (e.g., listings) with the publication system 116. Thus, the inventory extractor 218 accesses the inventory of the user directly from the publication system 116. Alternatively or additionally, the warehouse request indicates the specific item or item category the user is interested in warehousing and operation 404 is optional.

In operation 406, the inventory extractor 218 extracts item attributes of the item(s) or item type(s) from the inventory that the user wants to warehouse. In cases where the user has not yet have published or listed the items that they want to warehouse, the warehouse request indicates the specific item the user is interested in warehousing and the inventory extractor 218 extracts the attributes from the warehouse request or from a database of items that contains a listing of similar items (or item categories) available on the network system 102.

In operation 408, the analysis module 218 applies the machine learning model to the extracted attributes. The analysis module 218, using the machine learning model, matches the attributes used to train the machine learning model to the extracted attributes from the items or item categories to be warehoused to find the closest matching set of attributes. The analysis module 218 identifies item sale probabilities for a plurality of transaction zones for the closest matching set(s) and selects one or more transaction zones having the highest item sales probabilities for each item or item category. Thus, the analysis module 218 can identify a combination of an item (or item category) and corresponding transaction zones where the item is predicted to sell if more then one type of item is in the inventory, the analysis module 218 may provide multiple recommendations for item/transaction zone combinations.

In operation 410, the recommendation module 222 determines, based on the one or more transaction zones, one or more warehouse spaces that satisfy a spacing requirement for the items of the inventory. For example, the recommendation module 222 may determine, based item attributes related to sizing, an amount of space that is required for an item. Alternatively or additionally, the analysis module 220 or recommendation module 222 may determine a number of items to warehouse at a particular transaction zone based on historical item transactions. Alternatively or additionally, the user may specify a number of items to be warehoused. As such, the recommendation module 222 can determine based on the number of items and the amount of space required for each item, a total amount of warehouse space that is required at a particular transaction zone. The recommendation module 222 then accesses the available warehouse space that has been persisted and identifies one or more warehouse spaces that satisfy the spacing requirement at the particular transaction zone.

In operation 412, the recommendation module 222 provides the recommendation to the user of the client device 106. The recommendation can indicate one or more transaction zones where to warehouse the inventory or portion of the inventory (e.g., items of the inventory). The user can select a transaction zone (and in some cases, the item) and be presented the one or more warehouse spaces determined in operation 410. Alternatively, the recommendation may indicate both the transaction zones and the one or more warehouse spaces determined in operation 410 to the user.

Where the user indicates a desire to warehouse part of their inventory comprising different items and item categories, the inventory extractor 218 extracts the attributes for all item categories in the inventory and the analysis module 220 analyzes the different item categories of the inventory to provide a recommendation of which item(s) or item category to warehouse at which transaction zone. The recommendation presented in operation 412 can then include the item or item category and the corresponding transaction zone(s). Conversely, if the user indicates the item or item category they want warehoused, the analysis module 220 performs an analysis with respect to the attributes of the indicated item or item category and the recommendation indicates the transaction zone or warehouse space for the indicated item or item category.

Figure 5:
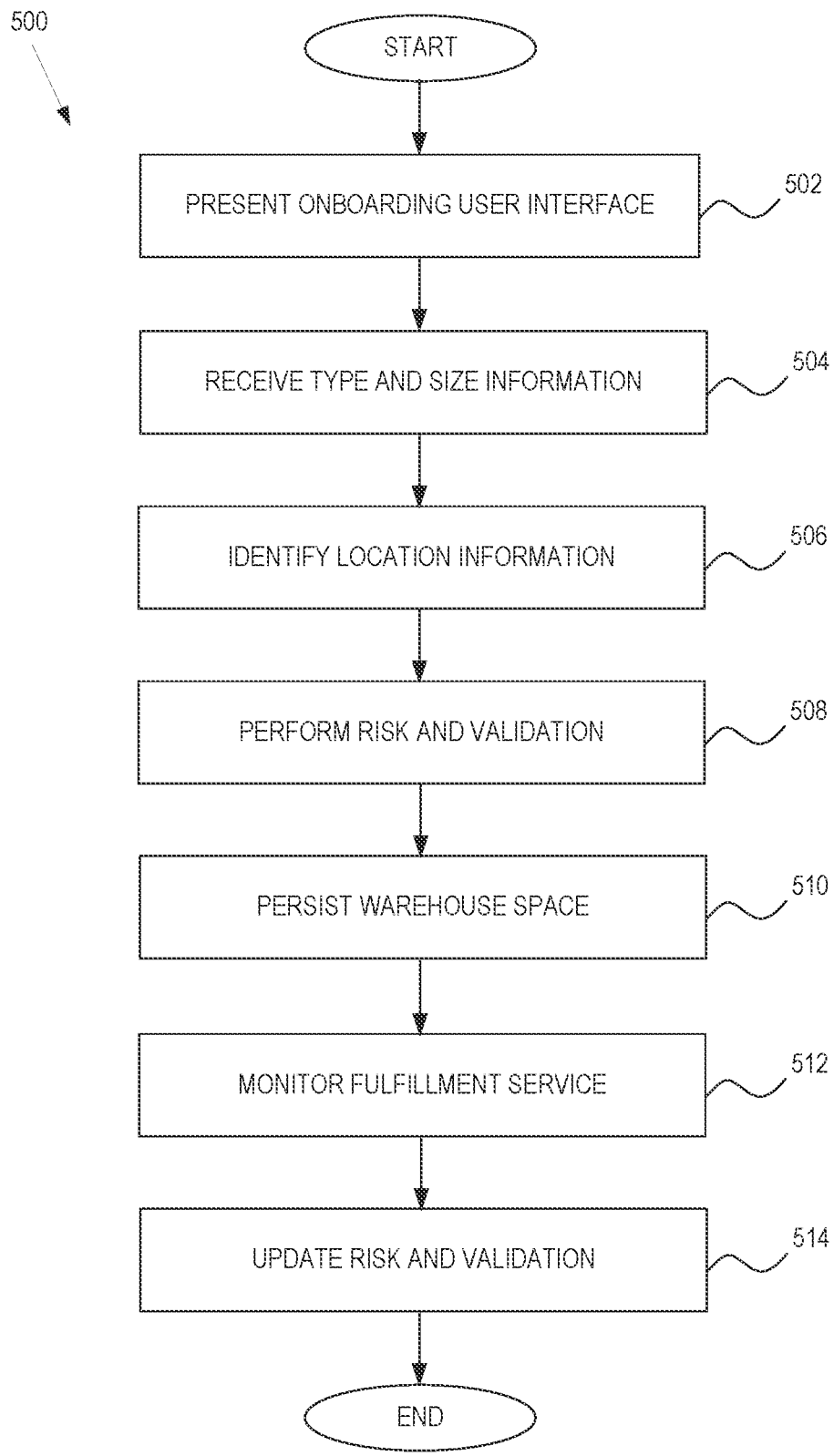
FIG. 5 is a flowchart illustrating operations of a method for onboarding warehousing space.

FIG. 5 is a flowchart illustrating operations of a method 500 for onboarding warehousing space. Operations in the method 500 may be performed by the warehouse management system 118 (e.g., the onboarding engine 202 and fulfillment engine 210), using components described above with respect to FIG. 2. Accordingly, the method 500 is described by way of example with reference to the management system 118. However, it shall be appreciated that at least some of the operations of the method 500 may be deployed on various other hardware configurations or be performed by similar components residing elsewhere in the network environment 100. Therefore, the method 500 is not intended to be limited to the management system 118.

In operation 502, the onboarding engine 202 causes presentation of an onboard user interface to a potential fulfillment partner. The onboarding user interface may include input fields for describing a type of warehouse space (e.g., garage, warehouse, storage shed), a size of the warehouse space (e.g., dimensions in meters or feet), and a location of the warehouse space (e.g., city, zip code).

In operation 504, the onboarding engine 202 receives the type and size information via the onboard user interface.

In operation 506, the onboarding engine 202 identifies location information. The potential fulfillment partner can enter the location information (e.g., a city or zip code). Additionally or alternatively, the potential fulfillment partner is known to the network system 102 as a registered user. Thus, the onboarding engine 202 can access the location information from a profile associated with the registered user.

In operation 508, the onboarding engine 202 performs a risk and validation process. For example, ratings and/or reviews of the potential fulfillment partner and length of time on the network system 102 are considered by the onboarding engine 202. The ratings may be associated with past fulfillment partnerships/warehouse services provided by the potential fulfillment partner or may be associated with the potential fulfillment partner's own sales activities on the network system 102 (e.g., via the publication system 116). The risk and validation process also includes execution of agreements/contracts during the onboarding or signup process that outline the responsibilities of the potential fulfillment partner.

In operation 510, the onboarding engine 202 persists the warehouse space of the potential fulfillment partner. This is done in response to the potential fulfillment partner satisfying conditions or standards for being a fulfillment partner based on the risk and validation process.

In operation 512, the fulfillment engine 208 monitors fulfillment services provided by the fulfillment partner. For example, the fulfillment engine 210 may track the progress of the shipping of items being fulfilled by the fulfillment partner and obtain ratings for the fulfillment/shipping process. The ratings may be associated with, for example, shipping speed or shipping issues (e.g., item poorly packaged).

These ratings are then provided back to the onboarding engine 202 as feedback for updating risk and validation for the fulfillment partner in operation 514. For instance, if the fulfillment partner receives poor reviews, the fulfillment partner may be prevented from onboarding future warehouse space or may not be recommended for future fulfillment activities. Conversely, if the fulfillment partner has high ratings, a publication for an item that will be fulfilled by the fulfillment partner may indicate that the item of the publication is fulfilled by a trusted partner or other similar notification.

While the above description discusses using a machine learning model to determine transaction zones to recommend to a user along with, in some cases, recommended items or item category, item quantities, and/or warehouse spaces, example systems and methods also contemplate a simplified version for providing the warehousing service. The simplified version allows the user to access a warehouse request user interface. Using the request user interface, the user simply enters a desired location (e.g., zip code) and spacing requirement (e.g., dimensions or in a standard unit). The system (e.g., warehousing engine 206) then identifies matching available warehouse spaces and presents these warehouse spaces to the user.

The warehouse space may belong to other users of the network system 102 (e.g., other sellers) and can comprise non-traditional warehouse space. For example, the non-traditional warehouse space may comprise a user's garage, storage shed, or portion of their house.

Figure 6:
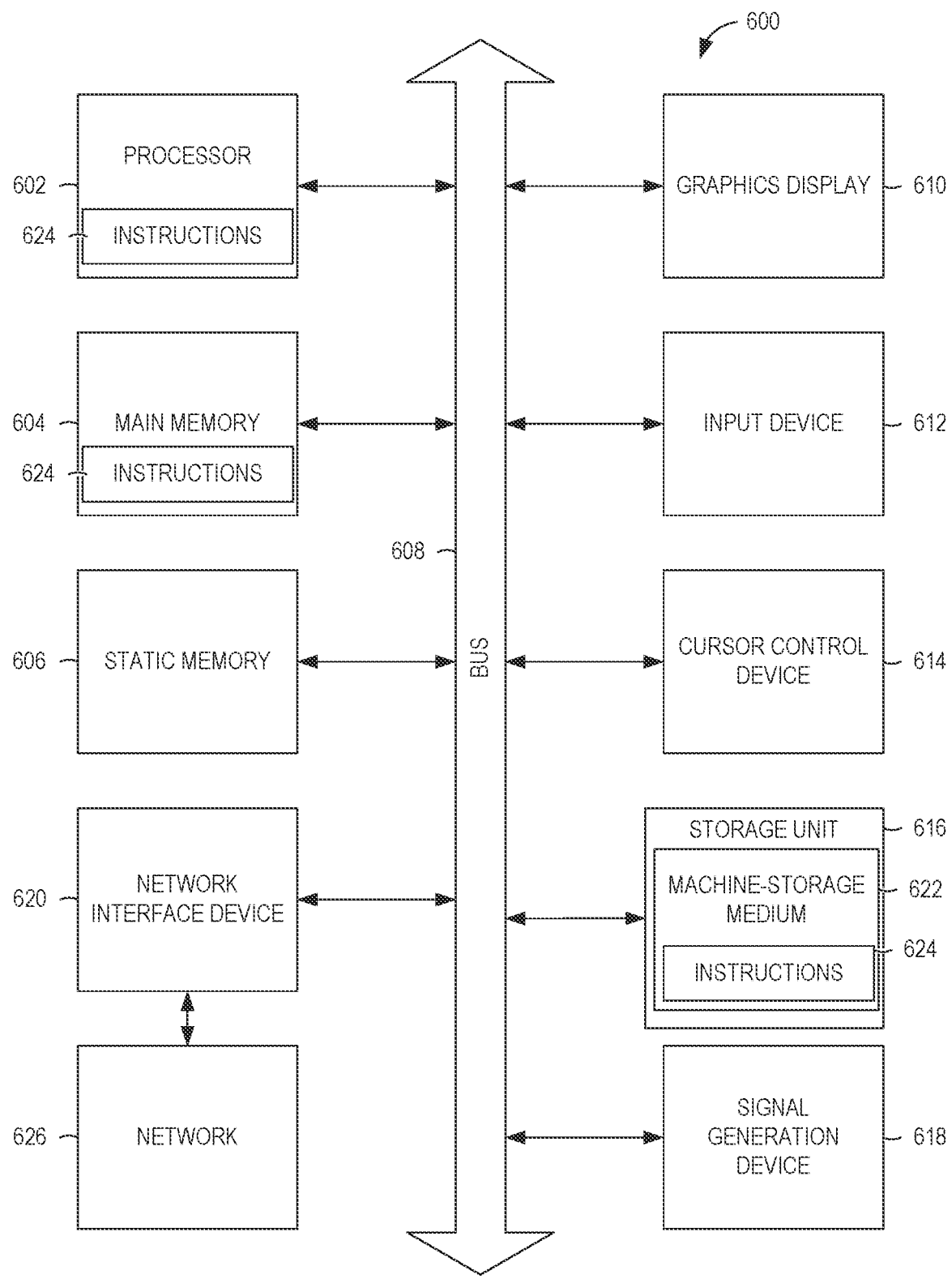
FIG. 6 is a block diagram illustrating components of a machine able to read instructions from a machine-readable medium and perform any one or more of the methodologies discussed herein.

FIG. 6 illustrates components of a machine 600 that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the block and flow diagrams of FIGS. 3 to 5. The instructions 624 can transform the general, non-programmed machine 600 into a particular machine (e.g., specially configured machine) programmed to carry out the described and illustrated functions in the manner described.

The machine 600 can operate as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

The machine 600 can be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed systems and methods.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain systems and methods are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. One or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

A hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. In cases in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission over appropriate circuits and buses) between or among two or more of the hardware modules. In cases in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. The one or more processors or processor-implemented modules may be located in a single geographic location (e.g., within a home environment, an office environment, or a server farm) and/or the one or more processors or processor-implemented modules may be distributed across a number of geographic locations.

EXAMPLES

Example 1 is a method for providing a warehousing service that utilizes a machine learning model to recommend warehouse locations. The method comprises training, by a network system, a machine learning model with training data comprising item attributes and transaction locations extracted from past transactions for each item category to identify a plurality of transaction zones; receiving, by the network system via an inventory user interface, a warehouse request to warehouse inventory in a remote location; determining, by one or more hardware processors of the network system, at least one transaction zone based on item attributes of the inventory by applying the trained machine learning model; based on the determined at least one transaction zone, determining one or more warehouse spaces that satisfy a spacing requirement; and causing presentation of the warehouse recommendation on a client device, the warehouse recommendation indicating the one or more warehouse spaces.

In example 2, the subject matter of example 1 can optionally include wherein training the machine learning model comprises accessing the past transactions, each of the past transactions indicating one or more of an item, an item attribute, and a transaction location; identifying the item category associated with the past transactions; for each item category, extracting the item attributes and the transaction location from the corresponding past transactions; and inputting the item attributes and the transaction locations as the training data for the machine learning model.

In example 3, the subject matter of any of examples 1-2 can optionally include wherein training the machine learning model comprises calculating a probability of an item selling in a transaction zone of the plurality of transaction zones.

In example 4, the subject matter of any of examples 1-3 can optionally include onboarding warehouse space of a fulfillment partner, the onboarding comprising causing presentation of an onboarding user interface to the fulfillment partner; receiving, via the onboarding user interface, size information for the warehouse space; identifying location information for the fulfillment partner; and persisting the warehouse space of the fulfillment partner with the size and the location information to data storage.

In example 5, the subject matter of any of examples 1-4 can optionally include monitoring the fulfillment service performed by the fulfillment partner; and using the monitoring to update risk and validation of the fulfillment partner.

Iii example 6, the subject matter of any of examples 1-5 can optionally include wherein determining the at least one transaction zone based on item attributes of the inventory comprises determining a combination of an item of the inventory and the at least one transaction zone where the item is recommended to be warehoused, wherein the recommendation indicates the item to be warehoused.

In example 7, the subject matter of any of examples 1-6 can optionally include wherein the determining the at least one transaction zone comprises predicting item sale probabilities for at least some of the plurality of transaction zones based on the inventory of the user, the determined at least one transaction zone being a transaction zone having one or more of the highest item sale probabilities for an item of the inventory.

In example 8, the subject matter of any of examples 1-7 can optionally include determining spacing requirement to warehouse the inventory; and based on the determined at least one transaction zone, determining one or more warehouse spaces within the at least one transaction zone that satisfy the spacing requirement.

In example 9, the subject matter of any of examples 1-8 can optionally include monitoring sales of items of the inventory at a warehouse location; and based on the monitoring, providing a notification to move more of the items to the warehouse location.

In example 10, the subject matter of any of examples 1-9 can optionally include wherein the one or more warehouse space comprises a warehouse space of another seller on the network system.

Example 11 is a system for providing a warehousing service that utilizes a machine learning model to recommend warehouse locations. The system comprises one or more hardware processors and a memory storing instructions that, when executed by the one or more hardware processors, cause the one or more hardware processors to perform operations comprising training a machine learning model with training data comprising item attributes and transaction locations extracted from past transactions for each item category to identify a plurality of transaction zones; receiving, via a user interface, a warehouse request to warehouse inventory in a remote location; determining at least one transaction zone based on item attributes of the inventory by applying the trained machine learning model; based on the determined at least one transaction zone, determining one or more warehouse spaces that satisfy a spacing requirement; and causing presentation of the warehouse recommendation on a client device, the warehouse recommendation indicating the one or more warehouse spaces.

In example 12, the subject matter of example 11 can optionally include wherein training the machine learning model comprises accessing the past transactions, each of the past transactions indicating one or more of an item, an item attribute, and a transaction location; identifying the item category associated with the past transactions; for each item category, extracting the item attributes and the transaction location from the corresponding past transactions; and inputting the item attributes and the transaction locations as the training data for the machine learning model.

In example 13, the subject matter of any of examples 11-12 can optionally include wherein training the machine learning model comprises calculating a probability of an item selling in a transaction zone of the plurality of transaction zones.

In example 14, the subject matter of any of examples 11-13 can optionally include onboarding warehouse space of a fulfillment partner, the onboarding comprising causing presentation of an onboarding user interface to the fulfillment partner; receiving, via the onboarding user interface, size information for the warehouse space; identifying location information for the fulfillment partner; and persisting the warehouse space of the fulfillment partner with the size and the location information to data storage.

In example 15, the subject matter of any of examples 11-14 can optionally include monitoring the fulfillment service performed by the fulfillment partner; and using the monitoring to update risk and validation of the fulfillment partner.

In example 16, the subject matter of any of examples 11-15 can optionally include wherein determining the at least one transaction zone based on item attributes of the inventory comprises determining a combination of an item of the inventory and the at least one transaction zone where the item is recommended to be warehoused, wherein the recommendation indicates the item to be warehoused.

In example 17, the subject matter of any of examples 11-16 can optionally include wherein the determining the at least one transaction zone comprises predicting item sale probabilities for at least some of the plurality of transaction zones based on the inventory of the user, the determined at least one transaction zone being a transaction zone having one or more of the highest item sale probabilities for an item of the inventory.

In example 18, the subject matter of any of examples 11-17 can optionally include determining spacing requirement to warehouse the inventory; and based on the determined at least one transaction zone, determining one or more warehouse spaces within the at least one transaction zone that satisfy the spacing requirement.

In example 19, the subject matter of any of examples 11-18 can optionally include wherein the one or more warehouse space comprises a warehouse space of another seller on the network system.

Example 20 is a computer-storage medium comprising instructions which, when executed by one or more hardware processors of a machine, cause the machine to perform operations for providing a warehousing service that utilizes a machine learning model to recommend warehouse locations. The operations comprises training a machine learning model with training data comprising item attributes and transaction locations extracted from past transactions for each item category to identify a plurality of transaction zones; receiving, via a user interface, a warehouse request to warehouse inventory in a remote location; determining at least one transaction zone based on item attributes of the inventory by applying the trained machine learning model; based on the determined at least one transaction zone, determining one or more warehouse spaces that satisfy a spacing requirement; and causing presentation of the warehouse recommendation on a client device, the warehouse recommendation indicating the one or more warehouse spaces.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    extracting, by a transaction extractor of a training component on a networking server, training data from past transactions, the training data including item attributes and transaction locations;
    transmitting, by the transaction extractor, the extracted data to a training hardware module of the training component on the networking server;
    training, by the training hardware module of the training component on the networking server, a machine learning model with the training data to identify probabilities of items selling in a plurality of transaction zones;
    onboarding, by an onboarding engine of the networking server, warehouse space of a fulfillment partner, the onboarding comprising:
        causing presentation of an onboarding user interface to the fulfillment partner;
        receiving, via the onboarding user interface, size information for the warehouse space;
        identifying location information for the fulfillment partner; and
        persisting the warehouse space of the fulfillment partner with the size information and the location information to data storage;
    receiving, by a warehousing engine on the networking server via a user interface, a warehouse request to warehouse inventory in a remote location;
    in response to receiving the request, triggering an analysis hardware module of the networking server to determine at least one transaction zone based on item attributes of the inventory by applying the trained machine learning model to identify one or more transaction zones having highest probabilities;
    based on the determined at least one transaction zone, determining, by a recommendation hardware module of the networking server, one or more warehouse spaces that satisfy a spacing requirement;
    causing presentation, by the recommendation hardware module of the networking server, of a warehouse recommendation on a client device, the warehouse recommendation indicating the one or more warehouse spaces; and
    periodically updating, by the training component of the networking server, the machine learning model by retraining on updated training data.

2. The method of claim 1, wherein training the machine learning model comprises:
    accessing the past transactions, each of the past transactions indicating one or more of an item, an item attribute, and a transaction location;
    identifying the item category associated with the past transactions;
    for each item category, extracting the item attribute and the transaction location from the corresponding past transactions; and
    inputting the item attribute and the transaction locations as the training data for the machine learning model.

3. The method of claim 1, wherein training the machine learning model comprises calculating a probability of an item selling in a transaction zone of the plurality of transaction zones.

4. The method of claim 1, further comprising:
monitoring the fulfillment service performed by the fulfillment partner; and
using the monitoring to update risk and validation of the fulfillment partner.

5. The method of claim 1, wherein determining the at least one transaction zone based on the item attributes of the inventory comprises determining a combination of an item of the inventory and the at least one transaction zone where the item is recommended to be warehoused, wherein the warehouse recommendation indicates the item to be warehoused.

6. The method of claim 1, wherein the determining the at least one transaction zone comprises predicting item sale probabilities for at least some of the plurality of transaction zones based on the inventory, the determined at least one transaction zone being a transaction zone having one or more of the highest item sale probabilities for an item of the inventory.

7. The method of claim 1, further comprising:
determining the spacing requirement to warehouse one or more items of the inventory; and
based on the determined at least one transaction zone, determining one or more warehouse spaces within the at least one transaction zone that satisfy the spacing requirement.

8. The method of claim 1, further comprising:
monitoring sales of items of the inventory at a warehouse location; and
based on the monitoring, providing a notification to move more of the items to the warehouse location.

9. The method of claim 1, wherein the one or more warehouse space comprises a warehouse space of another seller on the network server.

10. A system comprising:
one or more hardware processors; and
a memory storing instructions that, when executed by the one or more hardware processors, cause the one or more hardware processors to perform operations comprising:
  extracting, by a transaction extractor of a training component on a networking server, training data from past transactions, the training data including item attributes and transaction locations;
  transmitting, by the transaction extractor, the extracted data to a training hardware module of the training component on the networking server;
  training, by the training hardware module of the training component of the networking server, a machine learning model with the training data to identify probabilities of items selling in a plurality of transaction zones;
  onboarding, by an onboarding engine of the networking server, warehouse space of a fulfillment partner, the onboarding comprising:
    causing presentation of an onboarding user interface to the fulfillment partner;
    receiving, via the onboarding user interface, size information for the warehouse space;
    identifying location information for the fulfillment partner; and
    persisting the warehouse space of the fulfillment partner with the size information and the location information to data storage;
  receiving, by a warehousing engine on the networking server via a user interface, a warehouse request to warehouse inventory in a remote location;
  in response to receiving the request, triggering an analysis hardware module of the networking server to determine at least one transaction zone based on item attributes of the inventory by applying the trained machine learning model to identify one or more transaction zones having highest probabilities;
  based on the determined at least one transaction zone, determining, by a recommendation hardware module of the networking server, one or more warehouse spaces that satisfy a spacing requirement;
  causing presentation, by the recommendation hardware module of the networking server, of a warehouse recommendation to a client device, the warehouse recommendation indicating the one or more warehouse spaces; and
  periodically updating, by the training component of the networking server, the machine learning model by retraining on updated training data.

11. The system of claim 10, wherein training the machine learning model comprises:
accessing the past transactions, each of the past transactions indicating one or more of an item, an item attribute, and a transaction location;
identifying the item category associated with the past transactions;
for each item category, extracting the item attributes and the transaction location from the corresponding past transactions; and
inputting the item attributes and the transaction locations as the training data for the machine learning model.

12. The system of claim 10, wherein training the machine learning model comprises calculating a probability of an item selling in a transaction zone of the plurality of transaction zones.

13. The system of claim 10, wherein the operations further comprise:
monitoring the fulfillment service performed by the fulfillment partner; and
using the monitoring to update risk and validation of the fulfillment partner.

14. The system of claim 10, wherein determining the at least one transaction zone based on the item attributes of the inventory comprises determining a combination of an item of the inventory and the at least one transaction zone where the item is recommended to be warehoused, wherein the recommendation indicates the item to be warehoused.

15. The system of claim 10, wherein the determining the at least one transaction zone comprises predicting item sale probabilities for at least some of the plurality of transaction zones based on the inventory of the user, the determined at least one transaction zone being a transaction zone having one or more of the highest item sale probabilities for an item of the inventory.

16. The system of claim 10, wherein the operations further comprise:
determining the spacing requirement to warehouse one or more items of the inventory; and
based on the determined at least one transaction zone, determining one or more warehouse spaces within the at least one transaction zone that satisfy the spacing requirement.

17. The system of claim 10, wherein the one or more warehouse space comprises a warehouse space of another seller on the networking server.

18. A computer-storage medium comprising instructions which, when executed by one or more hardware processors of a machine, cause the machine to perform operations comprising:

extracting, by a transaction extractor of a training component on a networking server, training data from past transactions, the training data including item attributes and transaction locations;

transmitting, by the transaction extractor, the extracted data to a training hardware module of the training component on the networking server;

training, by the training hardware module of the training component on the networking server, a machine learning model with the training data to identify probabilities of items selling in a plurality of transaction zones;

onboarding, by an onboarding engine of the networking server, warehouse space of a fulfillment partner, the onboarding comprising:

causing presentation of an onboarding user interface to the fulfillment partner;

receiving, via the onboarding user interface, size information for the warehouse space;

identifying location information for the fulfillment partner; and persisting the warehouse space of the fulfillment partner with the size information and the location information to data storage;

receiving, by a warehousing engine on the networking server via a user interface, a warehouse request to warehouse inventory in a remote location;

in response to receiving the request, triggering an analysis hardware module of the networking server to determine at least one transaction zone based on item attributes of the inventory by applying the trained machine learning model to identify one or more transaction zones having highest probabilities;

based on the determined at least one transaction zone, determining, by a recommendation hardware module of the networking server, one or more warehouse spaces that satisfy a spacing requirement;

causing presentation, by the recommendation hardware module of the networking server, of a warehouse recommendation to a client device, the warehouse recommendation indicating the one or more warehouse spaces; and periodically updating, by the training component of the networking server, the machine learning model by retraining on updated training data.

\* \* \* \* \*